United States Patent
Beev et al.

(10) Patent No.: US 12,233,771 B2
(45) Date of Patent: Feb. 25, 2025

(54) SYSTEM AND METHOD FOR LIGHTING A LATERAL REGION OF A VEHICLE

(71) Applicant: VALEO VISION, Bobigny (FR)

(72) Inventors: Kostadin Beev, Bobigny (FR); Pierre Albou, Bobigny (FR); Hui Jin, Paris (FR); Gregory Planche, Bobigny (FR); Christophe Duval, Bobigny (FR); Christophe Dubosc, Bobigny (FR)

(73) Assignee: VALEO VISION, Bobigny (FR)

( * ) Notice: Subject to any disclaimer, the term of this patent is extended or adjusted under 35 U.S.C. 154(b) by 185 days.

(21) Appl. No.: 17/287,761

(22) PCT Filed: Oct. 11, 2019

(86) PCT No.: PCT/EP2019/077583
§ 371 (c)(1),
(2) Date: Apr. 22, 2021

(87) PCT Pub. No.: WO2020/083665
PCT Pub. Date: Apr. 30, 2020

(65) Prior Publication Data
US 2021/0400177 A1   Dec. 23, 2021

(30) Foreign Application Priority Data
Oct. 24, 2018   (FR) ...................................... 1859837

(51) Int. Cl.
*B60Q 1/00* (2006.01)
*B60Q 1/24* (2006.01)
(Continued)

(52) U.S. Cl.
CPC ........... *B60Q 1/0035* (2013.01); *B60Q 1/249* (2022.05); *B60Q 1/32* (2013.01); *G06V 10/143* (2022.01);
(Continued)

(58) Field of Classification Search
CPC .......... B60Q 1/0035; B60Q 1/24; B60Q 1/32; G06V 10/143; G06V 10/147; G06V 20/56; H04N 23/56
See application file for complete search history.

(56) References Cited

U.S. PATENT DOCUMENTS

| | | | | |
|---|---|---|---|---|
| 5,428,512 A | * | 6/1995 | Mouzas | B60Q 1/2665 362/802 |
| 5,626,412 A | * | 5/1997 | Kato | G02B 6/0008 362/459 |

(Continued)

FOREIGN PATENT DOCUMENTS

| | | |
|---|---|---|
| CN | 1227172 A | 9/1999 |
| CN | 103994383 A | 8/2014 |

(Continued)

OTHER PUBLICATIONS

International Search Report issued on Feb. 3, 2020 in PCT/EP2019/077583 filed on Oct. 11, 2019, citing references AA-AD therein, 2 pages.

(Continued)

*Primary Examiner* — James T Boylan
(74) *Attorney, Agent, or Firm* — Oblon, McClelland, Maier & Neustadt, L.L.P.

(57) ABSTRACT

The invention concerns a system for lighting a lateral region of a vehicle. The system includes a first rear light module capable of emitting a first light beam and a second front light module capable of emitting a second light beam. The first and second light modules are arranged such that their respective light beams are oriented towards each other. The invention also relates to a vehicle including such a system. The invention finally concerns a lighting method and a method for assisting the driving of a vehicle.

18 Claims, 3 Drawing Sheets

(51) Int. Cl.
*B60Q 1/32* (2006.01)
*G06V 10/143* (2022.01)
*G06V 10/147* (2022.01)
*G06V 20/56* (2022.01)
*H04N 23/56* (2023.01)

(52) U.S. Cl.
CPC ............ *G06V 10/147* (2022.01); *G06V 20/56* (2022.01); *H04N 23/56* (2023.01)

(56) References Cited

U.S. PATENT DOCUMENTS

| | | | | |
|---|---|---|---|---|
| 9,566,901 | B1* | 2/2017 | Lindsay | H05B 47/115 |
| 9,758,088 | B1 | 9/2017 | Salter et al. | |
| 9,797,565 | B2* | 10/2017 | Rapeanu | F21S 9/022 |
| 10,118,542 | B1* | 11/2018 | Salter | B60Q 9/002 |
| 2008/0122597 | A1* | 5/2008 | Englander | B60R 1/00 |
| | | | | 348/E7.086 |
| 2008/0259621 | A1* | 10/2008 | Peron | B60Q 1/32 |
| | | | | 362/487 |
| 2012/0105638 | A1 | 5/2012 | Englander | |
| 2012/0229645 | A1* | 9/2012 | Yamada | B60R 1/00 |
| | | | | 362/543 |
| 2014/0119013 | A1 | 5/2014 | Rapeanu | |
| 2014/0192196 | A1 | 7/2014 | Englander | |
| 2017/0344190 | A1* | 11/2017 | Wang | H04N 9/3179 |
| 2018/0228569 | A1* | 8/2018 | Strölin | F21S 8/043 |
| 2018/0312106 | A1* | 11/2018 | Tatara | B60Q 1/26 |
| 2018/0324367 | A1* | 11/2018 | Siddiqui | H04N 23/76 |
| 2018/0334099 | A1* | 11/2018 | Gao | B60Q 1/2603 |
| 2019/0359118 | A1* | 11/2019 | Spenner | H05B 45/00 |
| 2020/0265718 | A1* | 8/2020 | Watanabe | G01B 11/24 |
| 2020/0304943 | A1* | 9/2020 | Sakurai | B60Q 1/247 |
| 2022/0014650 | A1* | 1/2022 | Muramatsu | H04N 23/52 |
| 2022/0185170 | A1* | 6/2022 | Salter | B60Q 1/24 |

FOREIGN PATENT DOCUMENTS

| | | |
|---|---|---|
| CN | 105679090 A | 6/2016 |
| CN | 107131461 A | 9/2017 |
| CN | 108016358 A | 5/2018 |
| CN | 108237982 A | 7/2018 |
| CN | 108290516 A | 7/2018 |
| CN | 108349425 A | 7/2018 |
| DE | 10 2014 008 100 A1 | 10/2014 |
| DE | 10 2015 009 875 A1 | 3/2016 |
| DE | 10 2015 206 936 A1 | 10/2016 |
| DE | 20 2018 102 420 U1 | 6/2018 |
| FR | 978895 A | 4/1951 |
| WO | WO 2013/001978 A1 | 1/2013 |

OTHER PUBLICATIONS

Combined Chinese Office Action and Search Report issued Sep. 22, 2023, in corresponding Chinese Patent Application No. 201980069945.X (with English Translation and English Translation of Category of Cited Documents), citing documents 10-22 therein, 16 pages.

Combined Chinese Office Action and search Report issued Apr. 28, 2024 in Chinese Patent Application No. 201980069945.X (with Partial English Translation of Office Action only and English Translation of Category of Cited Documents), citing references 1-2 and 15 therein, 9 pages.

* cited by examiner

SYSTEM AND METHOD FOR LIGHTING A LATERAL REGION OF A VEHICLE

The invention relates to a system for lighting a lateral region of a vehicle and to a system for assisting with driving a motor vehicle. The invention also relates to a motor vehicle as such comprising such a lighting system or such an assisting system. The invention also relates to a method for lighting the lateral region of a vehicle and to a method for assisting with driving a motor vehicle, implemented by the lighting system and the assisting system, respectively.

PRIOR ART

With the development of autonomous motor vehicles, it is becoming necessary to improve driver assistance under all lighting conditions, especially with a view to managing various particular driving functions, including the functions referred to as:
- "lane keeping", which function allows a vehicle to follow its lane on a road, especially by detecting any deviation in path and signaling it to the driver;
- "lane centering", which function complements the preceding function, and more precisely allows the vehicle to be kept in the center of its lane autonomously,
- "lane changing", which function allows a vehicle to change lane, for example with a view to overtaking,
- "autonomous emergency braking" (or more simply AEB),
- "autonomous emergency steering" (or more simply AES), which function allows an obstacle present in the lane to be avoided,
- "parking assistance", and "autonomous parking".

In these various functions, the assisting system needs to receive input information, especially including information regarding the detection of ground markings, such as the lines bounding lanes, and/or the presence of any obstacles on the road. This detection must be able to be carried out under all conditions, and especially at night.

It is noted that existing vehicle lighting illuminates the road in front of the vehicle from a distance of two meters in its own lane and five meters in adjacent lanes.

However, lighting the region beside the vehicle is more difficult because the illumination must cover the entirety of a rectangular area adjacent to the vehicle, which area extends from a few centimeters to several meters from the vehicle and extends over a length about ten meters. The angular extent of this region to be illuminated makes it very difficult to light this entire area uniformly.

These constraints mean that, at the present time, it is difficult, if not impossible, to be able to detect certain ground markings or obstacles near a vehicle, especially in lateral regions, this preventing provision of an assisting system able to perform the aforementioned functions required by an autonomous vehicle.

SUBJECT OF THE INVENTION

The aim of the invention is to provide a system and a method for lighting a lateral region of a vehicle that remedy the above drawbacks and improve systems and methods for assisting with driving a motor vehicle, and that especially allow them to perform the aforementioned assistance functions, so as to make them suitable for assisting an autonomous vehicle.

In addition, the aim of the invention is to provide a solution for lighting and assisting with driving a motor vehicle that is simple and reliable while not generating excessively high extra costs.

To this end, the invention relates to a system for lighting a lateral region of a vehicle, comprising a rear first luminous module capable of emitting a first light beam and a front second luminous module capable of emitting a second light beam. The first and second luminous modules are arranged so that their respective light beams are oriented toward each other.

In one embodiment, the first light beam is oriented along a first main emission axis, and the second light beam is oriented along a second main emission axis. The projections on a horizontal plane of the first main emission axis and of the second main emission axis intersect.

In one embodiment, the two luminous modules are placed so that their light beams are able to cross in a region of overlap, bounded by a crossing point located at a distance from the vehicle comprised between 50 cm and 5 m.

In one embodiment, the first luminous module and the second luminous module are placed at a distance greater than 15 cm from each other.

In one embodiment, the first luminous module and/or the second luminous module comprises at least one source of infrared light, preferably of near-infrared light.

The invention also relates to a system for assisting with driving a vehicle, comprising a lighting system according to the invention and at least one image-capturing device such as a still camera or a video camera.

The invention also relates to a vehicle, especially a motor vehicle, comprising a lighting system according to the invention or a system for assisting with driving a vehicle according to the invention.

In one embodiment, the first luminous module is placed on a rear portion of the vehicle and the second luminous module is placed on a front portion of the vehicle, and the first main emission axis is oriented toward the front portion of the vehicle and the second main emission axis is oriented toward the rear portion of the vehicle.

In one embodiment, the first luminous module and/or the second luminous module is placed on a bottom portion of the vehicle, preferably at a distance from the ground comprised between 20 cm and 50 cm.

In one embodiment, the vehicle further comprises an image-capturing device arranged so as to take an image of a lateral region of the vehicle.

The invention also relates to a method for lighting a lateral region of a vehicle. Said lighting method comprises a step of emitting a first light beam with a rear first luminous module and a step of emitting a second light beam with a front second luminous module. The two light beams are oriented toward each other.

The invention lastly relates to a method for assisting with driving a vehicle, comprising implementing a lighting method according to the invention, and a step of capturing an image of a lateral region, of a vehicle, illuminated by at least one of the two light beams.

BRIEF DESCRIPTION OF THE DRAWINGS

These objects, features and advantages of the present invention will be described in detail in the following description of particular non-limiting embodiments with reference to the appended figures, in which:

FIG. 2 shows the vehicle equipped with the lighting system according to the embodiment of the invention, with only the illumination of the first luminous module turned on.

FIG. 3 shows the vehicle equipped with the lighting system according to the embodiment of the invention, with only the illumination of the second luminous module turned on.

DETAILED DESCRIPTION

To facilitate the description, the direction extending from the rear to the front of a vehicle, i.e. the direction in which a vehicle moves forward, will be denoted the longitudinal direction, as is conventional. This direction is illustrated by an arrow A in the figures. The direction perpendicular to the longitudinal direction, in a horizontal plane defined by the plane on which the vehicle rests, will be denoted the transverse direction. Lastly, the direction perpendicular to the two preceding directions and oriented upward will be denoted the vertical direction.

Figure 6:
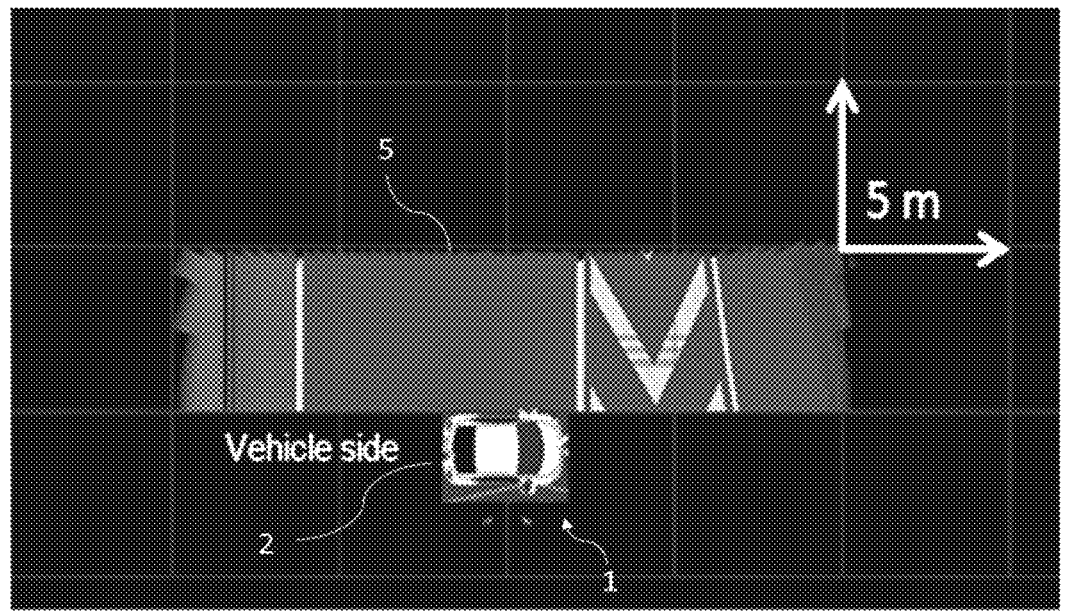
FIG. 6 shows a view from above of a vehicle and of the lateral region of the vehicle to be illuminated according to one embodiment of the invention.

An example of a vehicle 2 equipped with a system for lighting a lateral region according to one embodiment is described below with reference to FIGS. 1 to 6. The vehicle 2 is preferably a motor vehicle such as an automobile or a truck. It comprises a lateral side 21. It is equipped with a lighting system 1 according to one embodiment of the invention, which allows a lateral region 5, of the vehicle, adjacent to or near this lateral side 21 to be illuminated. As illustrated in FIG. 6, this lateral region 5 of the vehicle 2 may be defined by a rectangular area adjacent to the vehicle or located at a distance less than or equal to 10 cm, preferably less than or equal to 5 cm. The lateral region 5 is preferably an area on the ground, i.e. a segment of the horizontal surface on which the vehicle 2 rests. As illustrated in FIG. 6, the lateral region 5 to be illuminated may extend over a length of about 20 m and a width of about 5 m.

The lighting system 1 comprises a rear first luminous module 3 and a front second luminous module 4. The light emitted by the luminous modules 3, 4 may be visible light or infrared light. Infrared light is invisible to the human eye, and therefore allows the luminous modules 3, 4 to emit a light beam that complies with the regulations in force. Preferably, the light emitted by the luminous modules 3, 4 may be light the radiation of which covers the wavelengths of the near infrared. Specifically, the near infrared is advantageous to use because, in addition to allowing a beam to be formed that is invisible to the human eye and therefore in compliance with the regulations in force, sensors commonly used to detect visible light are also sensitive to near-infrared light, whereas they are not sensitive to the rest of the infrared band. Emitting near-infrared light thus makes it possible not to use a sensor specifically designed to capture infrared light. By near infrared, what is meant is radiation the wavelength of which is comprised between 0.7 μm and 2.5 μm or between 0.7 μm and 1.1 μm.

The luminous modules 3, 4 are placed so as to illuminate the lateral region 5 of the vehicle 2. The luminous modules 3, 4 are placed so as to illuminate the ground.

Figure 2:
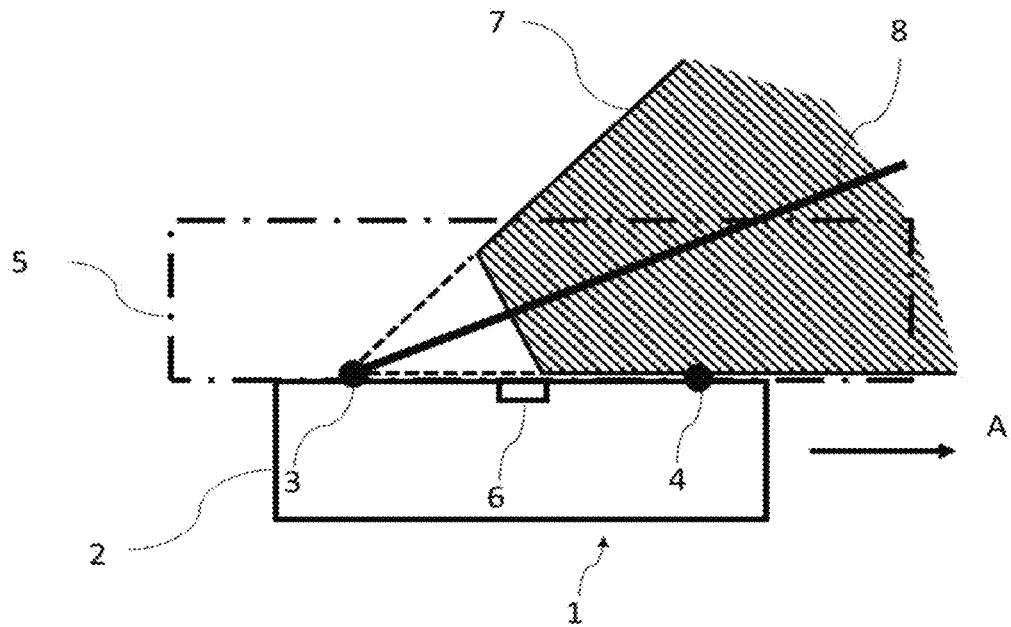

As illustrated in FIG. 2, the first luminous module 3 emits a first light beam 7 along a first main emission axis 8. This first light beam 7 is substantially comprised in a conical volume the axis of which is the first main emission axis 8. The area of the ground illuminated by the first luminous module 3 is represented by the hatched area. It is noted that, because of the vertical emission angle of the light beam and of the height of the first luminous module 3, the first light beam 7 does not touch the ground for the first few centimeters.

By "vertical emission angle", what is meant is the opening angle of the beam on a vertical plane. In contrast, "horizontal emission angle" means the opening angle of the beam on a horizontal plane.

Figure 3:
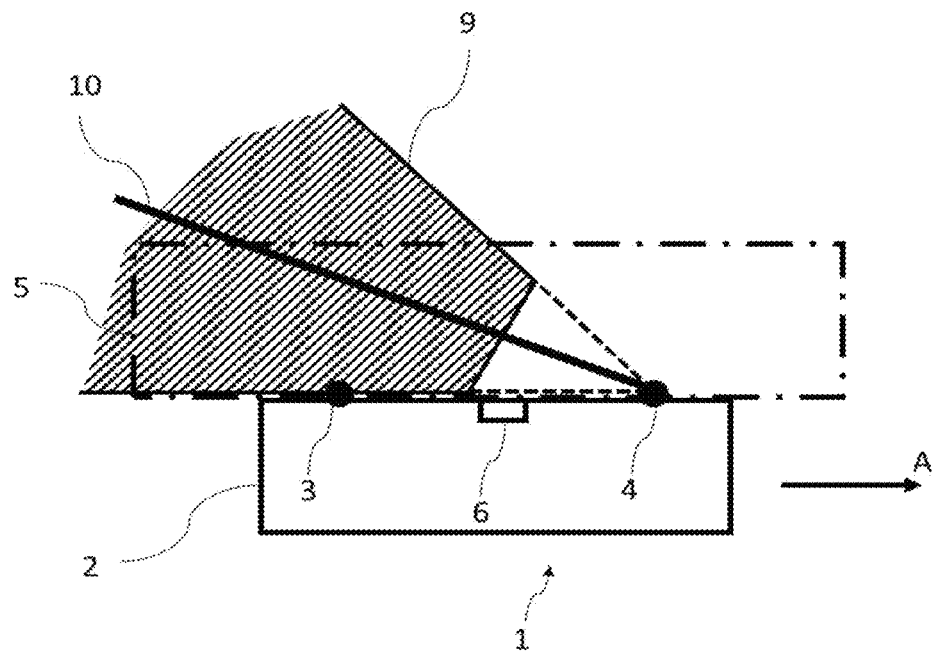

As illustrated in FIG. 3, the second luminous module 4 emits a second light beam 9 along a second main emission axis 10. This second light beam 9 is substantially comprised in a conical volume the axis of which is the second main emission axis 10. The area of the ground illuminated by the second luminous module 4 is represented by the hatched area.

A light beam must be understood to be a set of light rays all output from the same source or from the same point. The main emission axis is an axis passing through the source of the light beam and on which the light intensity output from the source is the highest. As mentioned previously, all of the light rays of the light beam are substantially comprised in a volume of conical shape formed around the main emission axis.

According to the embodiment of the invention, the first light beam 7 of the rear first luminous module 3 is oriented frontward. The second light beam 9 of the front second luminous module 4 is oriented rearward. The two light beams 7, 9 are thus oriented toward each other. Thus, the two light beams 7, 9 cross, especially in proximity to the vehicle, i.e. at least some of the light rays of each beam cross, so that the two light beams 7, 9 overlap in a region of overlap 12 located between the two luminous modules. In its horizontal projection on the plane of the road, this region of overlap 12 has a triangular shape, bounded by a crossing point 11 which is the point of said region of overlap 12 furthest from the vehicle 2.

In other words, the main emission axes 8, 10 are oriented toward each other. They cross so that the first beam 7 is oriented toward the second module 4 and vice versa. The first main emission axis 8 and the second main emission axis 10 therefore intersect, in the embodiment in which the two lighting modules 3, 4 have the same height in the vertical direction. If these two lighting modules 3, 4 have a different height or a different orientation in the vertical direction, their main emission axes 8, 10 are at different heights, but their projection on a horizontal plane intersects, as is particularly shown in FIG. 4.

Figure 1:
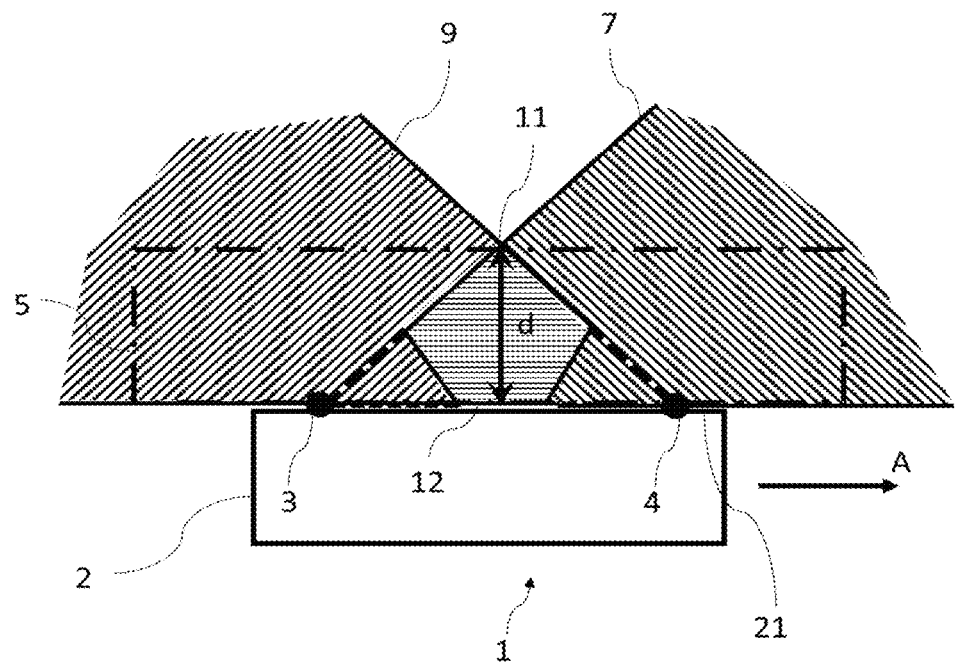
FIG. 1 schematically shows a view from above of a vehicle equipped with a lighting system according to one embodiment of the invention.
Figure 4:
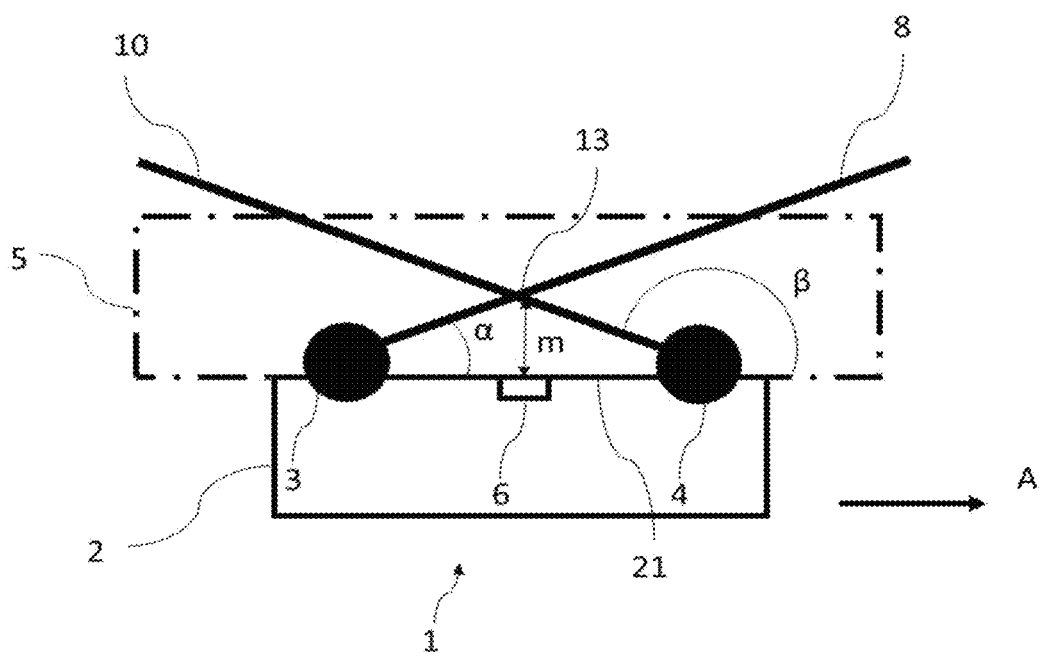
FIG. 4 shows the main emission axes of the two luminous modules of the lighting system according to the embodiment of the invention.
Figure 5:
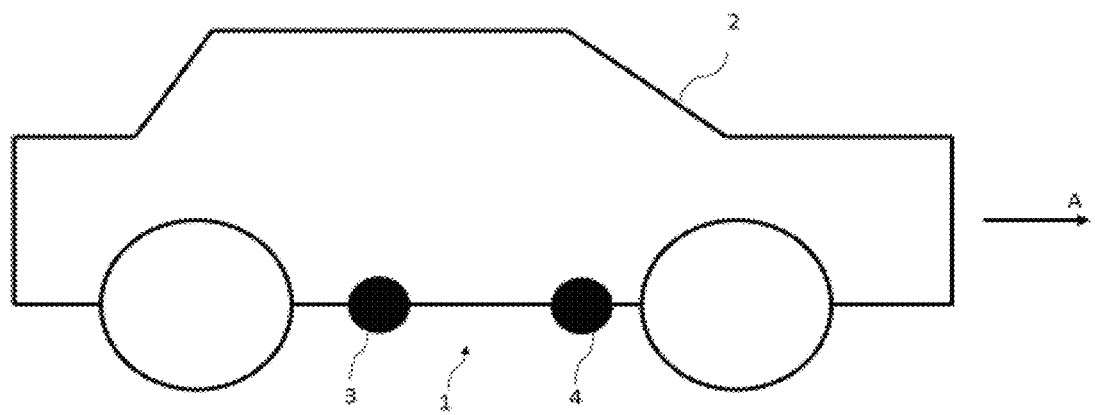
FIG. 5 shows a side view of a vehicle equipped with a lighting system according to one embodiment of the invention.

The first luminous module 3 and the second luminous module 4 are arranged so that the crossing point 11 defined above is located in proximity to a lateral side 21. The distance d between said crossing point 11 and the lateral side 21 of the vehicle 2 is preferably comprised between 50 cm and 5 m, very preferably comprised between 4 m and 5 m. This distance advantageously corresponds at least to the side of the lateral region 5 parallel to the vehicle and furthest from the vehicle, so as to cover all this lateral region 5, as illustrated in FIG. 1. As illustrated in FIG. 4, the first main emission axis 8 and the second main emission axis 10 (or their projection on a horizontal plane) intersect at a meeting point 13. The distance m between said meeting point 13 and the lateral side 21 of the vehicle 2 is preferably comprised between 25 cm and 2 m, very preferably comprised between 50 cm and 1 m.

In one embodiment, the first main emission axis 8 makes an angle α with the lateral side 21 of the vehicle 2 comprised between 15° and 35°, preferably between 20° and 25°.

In one embodiment, the second main emission axis 10 makes an angle β with the lateral side 21 of the vehicle 2 comprised between 165° and 145°, preferably between 160° and 155°.

The first luminous module 3 and the second luminous module 4 may be separated by a distance greater than 15 cm, preferably by a distance comprised between 15 cm and 4.5 m. This distance between the two luminous modules advantageously permits optimum illumination of the portion of the lateral region 5 of the vehicle 2 comprised between the two luminous modules, and of the portions of the lateral region that are located toward the front and rear of the vehicle 2.

The first luminous module 3 and the second luminous module 4 may be placed on the bottom portion of the vehicle, i.e. on a portion closer to the ground. The distance between the ground and the first luminous module 3 and/or the second luminous module 4 is preferably comprised between 20 cm and 50 cm.

This bottom ground position allows the distance between the luminous module and the first point of the beam to reach the ground to be decreased. It is thus possible to use luminous modules the vertical emission angle of which is small.

As will be clear from FIG. 1, the luminous modules are thus arranged so that their beams cover the entirety of the lateral region 5. Such an arrangement of the first luminous module 3 and of the second luminous module 4 therefore advantageously especially allows the portion of the lateral region 5 of the vehicle located between the two luminous modules to be illuminated. Such an arrangement also allows the periphery of the portion of the lateral region 5, especially the peripheral portion oriented toward the lateral side 21 of the vehicle 2, to be illuminated. The entirety of the area of the lateral region 5 of the vehicle 2 is thus illuminated with a minimum intensity.

Preferably, the luminous modules 3, 4 are placed so that the beams each comprise at least one light ray parallel to the lateral side 21 of the vehicle.

As illustrated in FIG. 1, this arrangement advantageously makes it possible for the first luminous module 3 to illuminate the portion of the ground located in proximity to the second luminous module 4, in proximity to the lateral side 21 of the vehicle. As explained above, this portion is not illuminated by the second luminous module because of the vertical emission angle of the second light beam 9 and of the height of the second luminous module 4.

Likewise, the second luminous module 4 illuminates the portion of the ground located in proximity to the first luminous module 3, in proximity to the lateral side 21 of the vehicle. A light ray from the first luminous module 3 parallel to the lateral side 21 of the vehicle 2 allows the area of the ground under the second luminous module 4 to be illuminated, and vice versa.

The invention thus advantageously allows luminous modules of small horizontal emission angle to be used while allowing the entirety of the lateral region 5, including the portion closest the luminous modules 3, 4, to be illuminated.

In one embodiment, the horizontal emission angle of the first luminous module 3 and/or of the second luminous module 4 is equal to 70° or comprised between 65° and 75°. Crossing the luminous modules advantageously allows the horizontal emission angle of the luminous modules to be decreased.

It is noted that with luminous modules with main emission axes oriented parallel, and perpendicular to the lateral side 21, the portions of the lateral side of the vehicle furthest from the modules would be insufficiently illuminated. Such an arrangement would require luminous modules with a horizontal emission angle at least equal to 180°, which are more expensive and more difficult to produce.

It is furthermore noted that with two luminous modules placed side by side and not crossed, the horizontal emission angle of the luminous modules would need to be at least equal to 90°.

The luminous modules 3, 4 may be placed in a recess in the vehicle body. Specifically, since the invention advantageously allows the area close to a luminous module to be illuminated with the other module, it is possible to recess the luminous module so as to protect it from shocks without impacting the illumination of the portion of the lateral region 5 closest the lateral side 21 of the vehicle.

The invention also relates to an assisting system comprising a lighting system according to the embodiment of the invention. This assisting system in addition comprises at least one image-capturing device 6 such as a still camera or a video camera. The image-capturing device 6 is arranged so as to capture an image or a video of the lateral region 5, of the vehicle 2, illuminated by the lighting system 1. It especially allows images of the ground in proximity to the motor vehicle, such as information on obstacles and markings on the road, to be captured both during the day and at night.

The system for assisting with driving also comprises a central unit, which may correspond to any hardware and/or software means of a smart managing unit, comprising at least one computer, for example one or more microprocessors, for implementing a method for assisting with driving. This central unit may be placed in any location in or on the motor vehicle, and may for example be integrated into the on-board computer of the motor vehicle. As a variant, it may be located within an image-capturing device 6. The system for assisting with driving thus comprises a device for detecting markings and/or any element on the ground, which device is formed by the combination of at least one image-capturing device and of an image-processing unit.

The assisting system further comprises communication means connecting the one or more cameras to the central unit, so as to allow it to receive the images from the camera. The central unit comprise image-processing software, with a view to deducing therefrom the information required by the driver assistance. Thus, the assisting system more generally comprises a device for detecting markings on the ground and/or obstacles and/or any element in a lateral region of the vehicle. The assisting system further comprises communication means connecting the central unit to the luminous modules and to the at least one image-capturing device 6, with a view to controlling, activating and/or deactivating them.

The invention also relates to a vehicle 2, especially a motor vehicle, comprising such a lighting system 1 and such an assisting system. For this reason, the vehicle 2 comprises at least a first luminous module 3 and a second luminous module 4, as described above. These luminous modules are preferably arranged on or in proximity to a lateral side 21 of the vehicle.

The invention also relates to a method for lighting a lateral region 5 of a vehicle 2.

One mode of execution of the method for lighting a lateral region 5 of a vehicle 2 is described below.

The method comprises a first step of emitting a first light beam 7 with a first luminous module 3 placed on a rear portion of said vehicle 2 along a first main emission axis 8.

The method comprises a second step of emitting a second light beam 9 with a second luminous module 4 placed on a front portion of said vehicle 2 along a second main axis.

The two light beams 7, 9 are oriented toward each other, as detailed above.

The first step and the second step are preferably executed simultaneously.

In addition, the assisting system implements a method for assisting with driving, which comprises a first step consisting in emitting a particular illumination, with the one or more light beams described above, according to the described lighting method. The assisting method also comprises a step of capturing an image of a lateral region 5 of a vehicle 2.

The step of capturing an image is executed during the emission of the first light beam 7 and/or of the second light beam 9.

This method advantageously allows production of an image of the lateral region 5 of the vehicle 2, the entire area of which is illuminated with a sufficient intensity for a marking or an obstacle or a change in the structure of the lane to be detected.

The invention claimed is:

1. A lighting system for lighting a lateral region of a vehicle outside a lateral side of the vehicle, the system consisting of:
   a rear first luminous module configured to emit a first light beam; and
   a front second luminous module configured to emit a second light beam,
   wherein the rear first luminous module and the front second luminous module are arranged along a straight line portion of the lateral side of the vehicle so that the first light beam and the second light beam are oriented toward each other,
   the first light beam is configured to be substantially conical around a first main emission axis that has a first angle of 15°-35° with the lateral side of the vehicle,
   the second light beam is configured to be substantially conical around a second main emission axis that has a second angle of 145°-165° with the lateral side of the vehicle,
   the first main emission axis, the second main emission axis and the lateral side of the vehicle form a triangle, when viewed from above the vehicle, and
   the straight line portion of the lateral side of the vehicle is substantially parallel to a driving direction of the vehicle.

2. The lighting system as claimed in claim 1, wherein:
   the first light beam is oriented along the first main emission axis,
   the second light beam is oriented along the second main emission axis, and
   projections, on a horizontal plane, of the first main emission axis and of the second main emission axis intersect.

3. The lighting system as claimed in claim 1, wherein the rear first luminous module and the front second luminous module are arranged so that the first light beam and the second light beam are configured to cross in a region of overlap that is bounded by a crossing point located at a distance between 50 cm and 5 m from the vehicle.

4. The lighting system as claimed in claim 1, wherein the rear first luminous module and the front second luminous module are arranged at a distance greater than 15 cm from each other.

5. The lighting system as claimed in claim 1, wherein the rear first luminous module and/or the front second luminous module comprises at least one source selected from the group consisting of infrared light and near-infrared light.

6. An imaging system, consisting of: the lighting system as claimed in claim 1, and an image-capturing device.

7. The lighting system as claimed in claim 1, wherein:
   the rear first luminous module is placed on a rear portion of the vehicle,
   the front second luminous module is placed on a front portion of the vehicle,
   the first main emission axis is oriented toward the front portion of the vehicle, and
   the second main emission axis is oriented toward the rear portion of the vehicle.

8. The lighting system as claimed in claim 1, wherein the rear first luminous module and/or the front second luminous module is placed on a bottom portion of the vehicle.

9. The imaging system as claimed in claim 6, wherein the image-capturing device is configured to take an image of the lateral region of the vehicle.

10. A method for lighting the lateral region of the vehicle outside the lateral side of the vehicle by the lighting system of claim 1, the method consisting of:
    emitting the first light beam with the rear first luminous module; and
    emitting the second light beam with the front second luminous module.

11. A method for imaging the lateral region of the vehicle outside the lateral side of the vehicle by the imaging system of claim 6, the method consisting of
    emitting the first light beam with the rear first luminous module;
    emitting the second light beam with the front second luminous module; and
    capturing, with the image-capturing device, an image of the lateral region of the vehicle, illuminated by at least one selected from the group consisting of the first light beam and the second light beam.

12. The imaging system as claimed in claim 6, wherein the image-capturing device comprises a still camera or a video camera.

13. The imaging system as claimed in claim 6, wherein the image-capturing device is positioned along the lateral side of the vehicle.

14. The imaging system as claimed in claim 13, wherein the image-capturing device is positioned between the rear first luminous module and the front second luminous module.

15. The lighting system as claimed in claim 1, wherein the rear first luminous module and/or the front second luminous module comprises near-infrared light.

16. The lighting system as claimed in claim 1, wherein the rear first luminous module and/or the front second luminous module is placed on a bottom portion of the vehicle, at a distance between 20 cm and 50 cm from the ground.

17. The lighting system as claimed in claim 1, wherein the rear first luminous module and the front second luminous module are arranged at a distance between 15 cm and 4.5 m from each other.

18. The lighting system as claimed in claim 1, wherein the first light beam is configured to have a first horizontal emission angle of 65°-75°, and the second light beam is configured to have a second horizontal emission angle of 65°-75°.

* * * * *